(12) United States Patent
Zhang

(10) Patent No.: US 11,181,291 B2
(45) Date of Patent: Nov. 23, 2021

(54) DC VARAIABLE SPEED COMPRESSOR CONTROL METHOD AND CONTROL SYSTEM

(71) Applicant: ECOER INC., Mclean, VA (US)

(72) Inventor: Jianliang Zhang, Beijing (CN)

( * ) Notice: Subject to any disclaimer, the term of this patent is extended or adjusted under 35 U.S.C. 154(b) by 230 days.

(21) Appl. No.: 16/345,869

(22) PCT Filed: Nov. 1, 2016

(86) PCT No.: PCT/US2016/059871
§ 371 (c)(1),
(2) Date: Apr. 29, 2019

(87) PCT Pub. No.: WO2018/084828
PCT Pub. Date: May 11, 2018

(65) Prior Publication Data
US 2019/0249894 A1 Aug. 15, 2019

(51) Int. Cl.
| | |
|---|---|
| *F24F 11/46* | (2018.01) |
| *F24F 11/64* | (2018.01) |
| *F24F 11/65* | (2018.01) |
| *F24F 11/86* | (2018.01) |
| *G05B 13/04* | (2006.01) |
| *F25B 49/02* | (2006.01) |

(Continued)

(52) U.S. Cl.
CPC .............. *F24F 11/46* (2018.01); *F24F 11/64* (2018.01); *F24F 11/65* (2018.01); *F24F 11/86* (2018.01); *F25B 49/022* (2013.01); *G05B 13/042* (2013.01); *F24F 2110/10* (2018.01); *F24F 2110/12* (2018.01); *F24F 2130/10* (2018.01); *F24F 2140/50* (2018.01); *F24F 2140/60* (2018.01); *F25B 2500/19* (2013.01); *F25B 2600/0253* (2013.01); *F25B 2700/1931* (2013.01); *F25B 2700/1933* (2013.01); *F25B 2700/2106* (2013.01); *F25B 2700/21151* (2013.01); *F25B 2700/21152* (2013.01); *Y02B 30/70* (2013.01)

(58) Field of Classification Search
CPC .. F24F 11/30; F24F 11/46; F24F 11/64; F24F 11/65; F24F 11/67; F24F 11/86; F24F 2140/60; F24F 2140/50; F24F 2130/10; F24F 2110/10; F24F 2110/12; F24F 11/00; F24F 11/62; G05B 13/042; G05B 2219/23102; Y02B 30/70; F25B 49/022; F25B 2700/2106; F25B 2700/1931; F25B 2700/21152; F25B 2700/1933; F25B 2700/21151; F25B 2600/0253; F25B 2500/19; F25B 1/00; F25B 39/04; F25B 49/00; F25B 2600/01; F25B 2600/025; F25B 2600/0251; F25B 2600/0252; F25B 2700/15; F25B 2700/151; F25D 29/00; F25D 17/04; F25D 17/06
See application file for complete search history.

(56) References Cited

U.S. PATENT DOCUMENTS 8,909,384 B1 * 12/2014 Beitelmal ............... G06F 1/206
700/300
9,500,386 B1 * 11/2016 Walsh ..................... F24F 11/76
(Continued)

*Primary Examiner* — M. N. Von Buhr
(74) *Attorney, Agent, or Firm* — John Ye

(57) ABSTRACT

The present disclosure relates to the field of air conditioning technology. In particular, it involves a control method and control device based on a DC variable speed AC compressor.

20 Claims, 9 Drawing Sheets

(51) Int. Cl.
*F24F 140/60* (2018.01)
*F24F 140/50* (2018.01)
*F24F 130/10* (2018.01)
*F24F 110/10* (2018.01)
*F24F 110/12* (2018.01)

(56) References Cited

U.S. PATENT DOCUMENTS

| | | | | |
|---|---|---|---|---|
| 10,527,304 B2* | 1/2020 | Zhang | ................... | F24F 11/61 |
| 10,845,107 B2* | 11/2020 | Zhang | ................... | F25D 17/04 |
| 10,852,043 B2* | 12/2020 | Zhang | ................... | F25B 49/022 |
| 2005/0284165 A1* | 12/2005 | Grabon | ................ | F25B 49/022 |
| | | | | 62/228.5 |
| 2007/0227168 A1* | 10/2007 | Simmons | ............... | H05K 7/207 |
| | | | | 62/229 |
| 2010/0263393 A1* | 10/2010 | Chen | ................... | F25B 49/022 |
| | | | | 62/115 |
| 2012/0210736 A1* | 8/2012 | Rockenfeller | .......... | F25B 49/02 |
| | | | | 62/115 |
| 2013/0125572 A1* | 5/2013 | Childs | ................... | F25B 49/022 |
| | | | | 62/126 |
| 2013/0139529 A1* | 6/2013 | Lu | ........................ | F25B 49/027 |
| | | | | 62/89 |
| 2014/0013098 A1* | 1/2014 | Yeung | ................... | G06F 1/206 |
| | | | | 713/100 |
| 2014/0244051 A1* | 8/2014 | Rollins | ................. | F04D 27/004 |
| | | | | 700/282 |
| 2015/0333669 A1* | 11/2015 | Alexander | ........... | H02P 29/027 |
| | | | | 318/599 |
| 2016/0069624 A1* | 3/2016 | Rollins | ................. | F04D 25/028 |
| | | | | 415/122.1 |
| 2016/0097557 A1* | 4/2016 | Steinberg | ................ | F24F 11/00 |
| | | | | 700/278 |
| 2016/0359325 A1* | 12/2016 | Kawata | ..................... | H02J 3/14 |
| 2020/0072520 A1* | 3/2020 | Zhang | ................... | G05B 13/042 |

* cited by examiner

DC VARAIABLE SPEED COMPRESSOR CONTROL METHOD AND CONTROL SYSTEM

The present application is a national stage of PCT/US16/59871, filed on Nov. 1, 2016, with its specification incorporated by reference, but otherwise the same. The disclosure below will assume common knowledge of air conditioning and heat pump as well as their heat exchange principle in terms of achieving cooling and heating as well as DC inverter technology in varying compressor speed. Therefore, when discussing particular AC inner working, it is applied to heat pump collectively. The discussion will also treat compressor speed and compressor RPS (rotation per second) interchangeably as well.

BACKGROUND OF THE DISCLOSURE

With the development of air-conditioning technology, DC variable speed air conditioner is becoming mainstream product because it is energy efficient, low noise and good thermostatic, etc. DC variable speed AC can adjust the speed freely, therefore lower the number of on/off cycle, and achieve comfort and energy saving. But the variable speed AC in the current market provides their implementation only based on the basic matching principle—i.e. matching the current output to the current load, in order to lower the number of on/off cycle. When DC variable speed AC is concerned, a duration is defined as from starting the compressor at starting temperature, until stopping the compressor at stopping temperature. Within this duration time, as the temperature changes from the starting temperature to the stopping temperature, the temperature curve changes depending on how the speed control is implemented. Even assuming that the same starting temperature, stopping temperature and duration means the same cooling/heating experience to users, but in terms of energy consumption, each temperature curve represent a different profile. As indicated, the current variable speed AC implementation does not factor in energy consumption. Much missing particularly is a method to estimate the energy consumption in temperature curve profiles so to choose a speed control strategy based on matching a particular profile.

In considering the energy consumption calculation model, there are a lot of factors come into play. For example, how the future temperature changes in the environment is one factor, and so is the building heat gain coefficient, etc. This consideration would require the speed control method to have self-learning characteristic, in order to choose a best matching cooling/heating temperature curve profile.

SUMMARY OF THE DISCLOSURE

Based on the above deficiencies, an objective of the disclosure is to provide a new speed control method implementation, so that this new implementation will be able to estimate energy consumption in order to change to an optimal control policy. Another aspect of the new implementation is to change the speed control strategy in respond to peak energy consumption period, so that the energy consumption during peak period will be lowered, which leads to lowest energy consumption.

To achieve the above technical objectives, the present disclosure provides a control system for DC speed control AC compressor, comprises of: a speed control calculation unit, a data storage unit, an information acquisition unit, a network communication module and a speed control output unit.

As the speed control calculation unit, it is for calculating targeted saturation pressure/temperature, and based on the targeted saturation pressure/temperature, calculating the total output under high output mode and low output mode, as well as the duration under the high output mode and the low output mode.

As the data storage unit, it is for storing data used by the speed control calculation unit, including lookup table n for the load coefficient values with their corresponding outdoor temperatures, for the time duration.

As the information acquisition unit, it is for collecting sensor data generated by the outdoor unit, including the outdoor temperature, outdoor unit liquid outlet temperature, compressor return inlet temperature, compressor high pressure and compressor low pressure.

As the network communication module, it is for receiving from remote server the weather forecast, obtain temperature curve for the environment.

As the speed control output unit, it is for setting the AC speed based on the calculated values from the speed control calculation unit, namely the total output under high output mode and low output mode, as well as the duration under the high output mode and the low output mode. This control method would coincide the low output duration with peak environment temperature timing which is within the compressor on duration.

To achieve the aforementioned technical objectives, a new DC variable speed control method in the present disclosure comprises:

a. calculating total the indoor cool/heating load N;
b. calculating the total cooling/heating output capacity Q;
c. determining median value for targeted saturation pressure/temperature by comparing the relationship between total capacity Q, product of total load N and its upper limit coefficient, as well as product of total load and its lower limit coefficient—if Q>the product of N and its upper limit coefficient, or Q<the product of N and its lower limit coefficient, then reset target saturation pressure temperature median value—but if Q<the product of N and its upper limit coefficient, and Q>the product of N and its lower limit coefficient, then use the current saturation pressure temperature value as the target saturation pressure temperature median value;
d. based on the target saturation pressure temperature median value, setting target saturation pressure temperature for high output mode and low output mode, then calculating the corresponding total output QH (high) and QL (low), as well as duration $t_{high}$ (high) and $t_{low}$ (low);
e. arranging duration distribution for $t_{high}$ and $t_{low}$ within the timeframe of time2 (within which the peak environment temperature occurs while running the AC), in order to coincide the $t_{low}$ with the peak environment temperature timing during time2—then during the high output mode duration $t_{high}$, perform high output mode compressor control based on total needed QH—and during the low output mode duration $t_{low}$, perform low output mode compressor control based on total needed QL.

Definition

FIG. 1 shows an AC compressor operation cycle in this disclosure, defining $T_{on}$ as the room temperature at the time of the on signal is given by the indoor unit or the thermostat. Also defined is $T_{off}$, which is the room temperature at the time of the off signal given by the indoor unit or the thermostat. Continuing on, $t_0$ is defined as the time when the prior AC compressor off signal is given, $t_1$ is defined as the starting time of this AC compressor cycle and $t_2$ is defined as the stopping time of this AC compressor cycle. Continuing on, period from $t_0$ to $t_2$ is the defined as time0 (i.e. a DC variable speed compressor operation cycle), from $t_0$ to $t_1$ is the defined as time1 (i.e. compressor off duration), from $t_1$ to $t_2$ is the defined as time2 (i.e. duration for compressor to be on). If time2 is shorter, it means greater the load to handle, and greater the corresponding output. Negatively, the electrical consumption is also greater. Therefore, setting of time2 period can be set according to user's cooling/heating performance demand or energy-saving preference. But it can also be set by a remote server. The present disclosure assumes that time2 has been known by the time to perform speed control.

FIG. 2 shows a diagram of the disclosed AC system, including AC compressor sensors control unit, where G is defined as the system refrigerant circulation flow rate (in kg/s). This flow rate data is obtained from this compressor regression model:

$$G=f(PL,PH,Ts,RPS).$$

wherein, PL is AC compressor low pressure obtained by low-pressure sensor, and PH is AC compressor high pressure obtained by high-pressure sensor, Ts is return air temperature sensor value obtained, RPS for the AC compressor speed. These parameter data are real time data from operation, so their values can be corresponding to function of t. Therefore, the circulating refrigerant flow of G can also be obtained in real time by calculation.

From cooling thermodynamic, $H_{out}$ is defined as fluid outlet enthalpy, where its value can be obtained from the refrigerant's properties table:

$$H_{out}=f(PH,T_{out}).$$

This is possible because temperature can be obtained from fluid outlet temperature sensor, and the PH value can be obtained from the high pressure sensor.

Similarly, $H_{in}$ is defined as fluid inlet enthalpy, where its value can be obtained from the refrigerant's properties table:

$$H_{in}=f(PL,Ts).$$

This is also possible because temperature can be obtained from fluid inlet temperature sensor, and the PL value can be obtained from the low pressure sensor.

The system cooling capacity q can be expressed as a function of:

$$q=G\times(H_{out}-H_{in}).$$

Correspondingly, in heating, $H_{dis}$ is defined as compressor discharge outlet enthalpy, where its value can be obtained from the refrigerant's properties table:

$$H_{dis}=f(PH,Td).$$

Same as cooling, this is possible because Td can be obtained from compressor outlet temperature sensor, and the PH value can be obtained from the high pressure sensor. Therefore, in heating, heating capacity q can be expressed as a function of:

$$q=G\times(H_{dis}-H_{out}).$$

From the above, when q(t) is integrated from $t_1$ to $t_2$, that value will be the total cooling/heating output Q for the time interval:

$$\int_{t_1}^{t_2} q(t)dt.$$

Further, N is defined as total indoor load from the $t_0$ to $t_2$ time interval. Due to the fact that the cooling load increases when heat gain coefficient n increases, which corresponding outdoor temperature increases (or in the case of heating load increases when heat loss coefficient n increases, which corresponding outdoor temperature decreases), we can see that the indoor load coefficient n (heat gain/heat loss per unit of time) is a function of the outdoor air temperature, where:

$$n=f(T_a).$$

In the present disclosure, the functional relationship of $n$-$T_a$ values can be stored in numeric format within the lookup database.

Therefore, the total indoor load from $t_0$ to $t_2$ is N, where N is a formula of:

$$\int_{t_0}^{t_2} n(t)dt,$$

thereinafter, called Formula N.

From FIG. 1, when the compressor operating in one cycle, if the starting room temperature $T_{off}$ is the same as the ending room temperature $T_{off}$, then that means the total cooling/heating load from $t_0$ to $t_2$ is equal to total cooling/heating output from $t_1$ to $t_2$. Therefore, the indoor load coefficient can be observed from the output as:

$$n = \frac{\int_{t_1}^{t_2} q(t)dt}{\text{time0}},$$

thereinafter, called Formula A.

From this relationship, every time when the AC system runs one interval from start to end under various outdoor temperatures, the indoor load coefficient can be observed and stored in the data storage unit. Therefore, by retrieving the corresponding indoor load coefficient n, one can get the total indoor load N from $t_0$ to $t_2$. Extending this $t_0$ to $t_2$ as an operating period of general AC consumption, the total load of N can be compared with the accumulated total output Q from $t_1$ to $t_2$. Therefore, with an accumulated lookup table based on self-learning, a new indoor load coefficient is obtained each time the AC system runs an interval. This makes it possible for a given outdoor temperature, an indoor load coefficient n can be filtered from the lookup table to match the heat gain/heat loss characteristics.

Selecting Load Coefficient n

Because it is possible for the user to stop the AC before the temperature setting is reached—not a complete cycle, therefore, data points from these instances would not give accurate relationship between n and average outdoor temperature $T_a$.

If there is communication between outdoor unit and indoor unit/thermostat, one can determine the reliability of load coefficient n from knowing whether the indoor temperature has reached to the temperature setting.

If there are only on-off signals between outdoor unit and indoor unit/thermostat, a technical solution can be found taking an average value from the multiple data points for a given temperature to account for the effect of such occurrences, or set a reliability threshold to filter out the unreliable data points.

Compressor Output Speed Expression

In terms of DC variable speed AC compressor, the compressor speed F, compressor target saturation pressure and target saturation temperature are correlated—knowing one would get to the other two. Based on targeted saturation temperature, the present disclosure of performing compressor PID (proportional, integral, and derivative) control is for adjusting the DC variable speed AC compressor operation speed F.

Selecting the Best Energy Saving Temperature Curve

The present disclosure configures the DC variable speed AC compressor such that the cooling/heating output mode is either high—QH, or low—QL, with the corresponding high output duration and low output duration in time2 operation cycle.

Further, the implementation should obtain temperature curve forecast on the environment and adjust the running mode so that at the peak temperature timing, it would be within the low output operating cycle of the DC variable speed AC compressor. Doing so, would lower the electricity consumption.

DETAILED DESCRIPTION OF THE DISCLOSURE

First Embodiment

Figure 1:
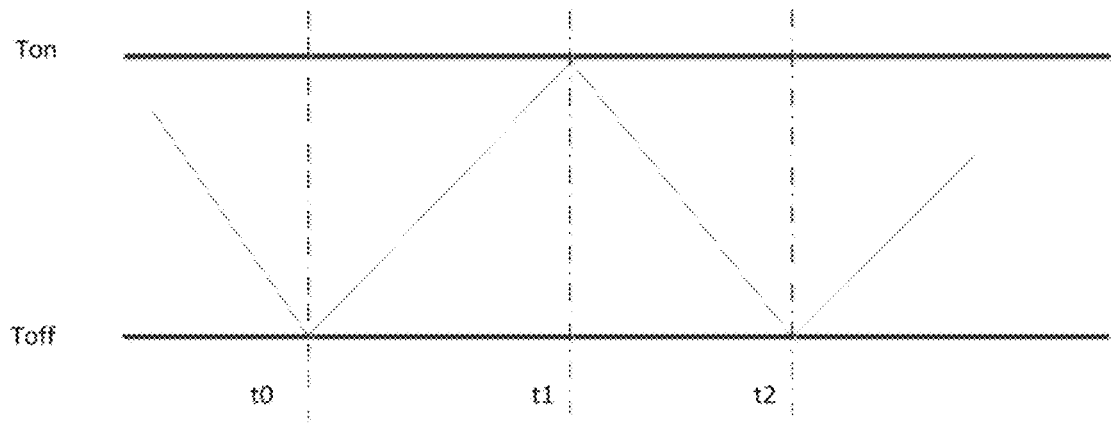
FIG. 1 shows an AC compressor operation cycle of this disclosure.
Figure 1:
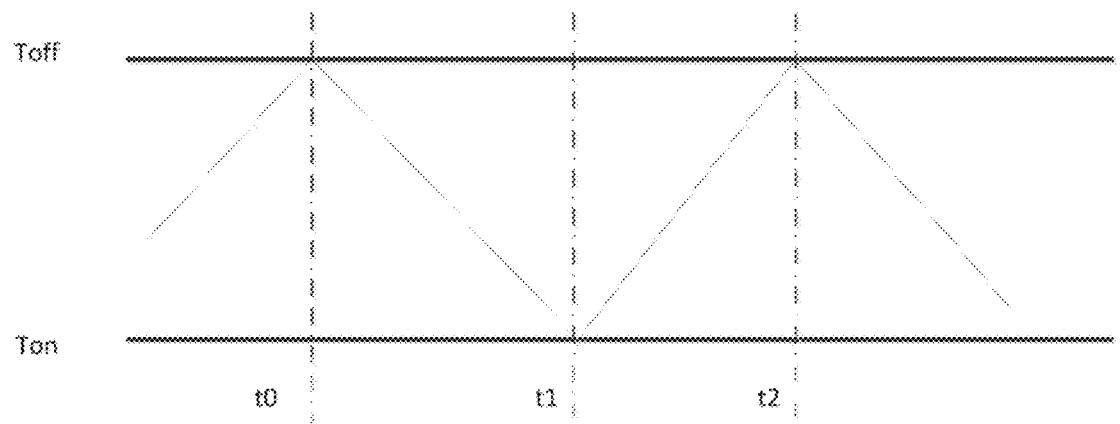
Figure 2:
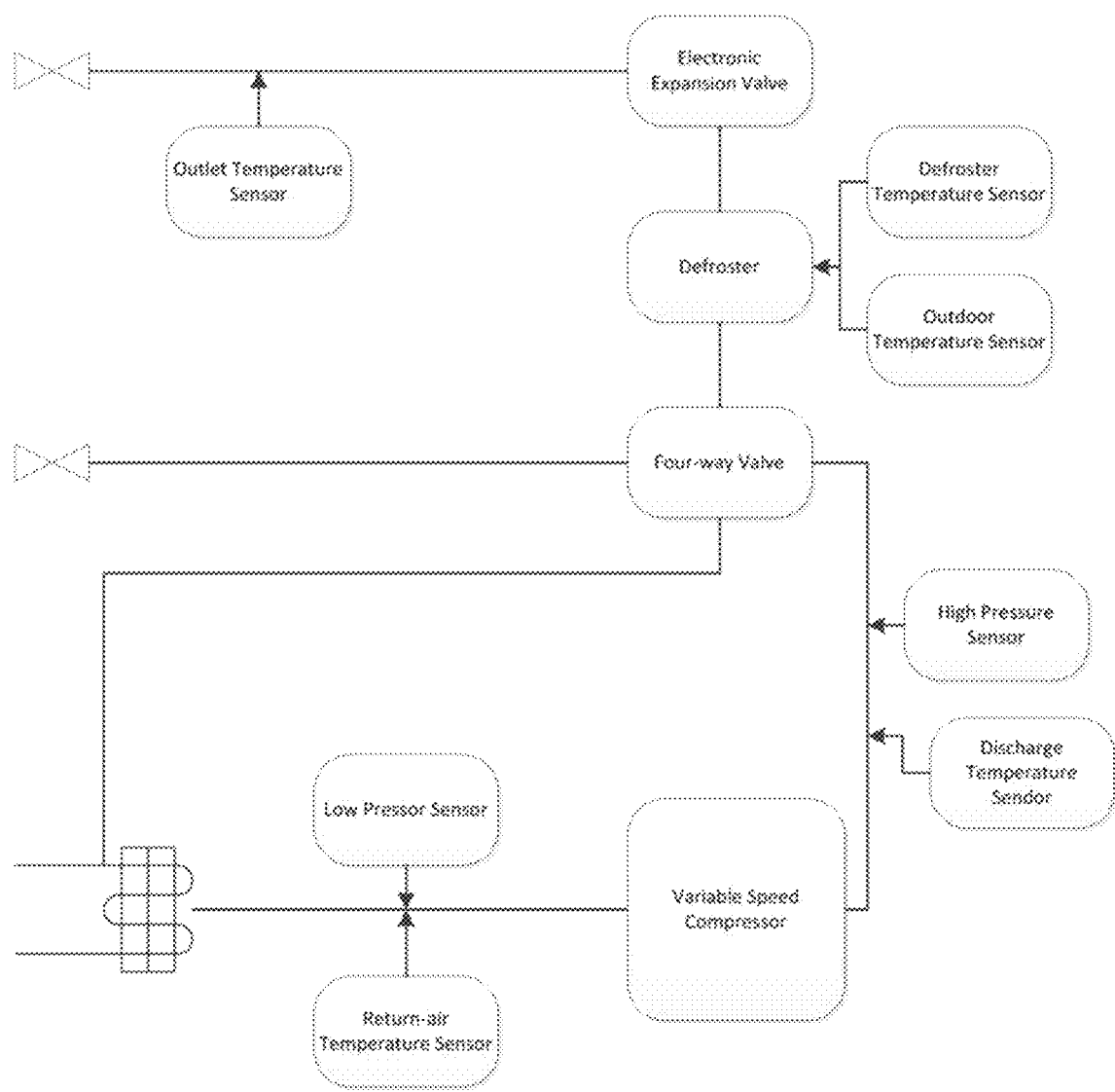
FIG. 2 shows a system diagram of the new variable AC unit implementation of this disclosure.
Figure 3:
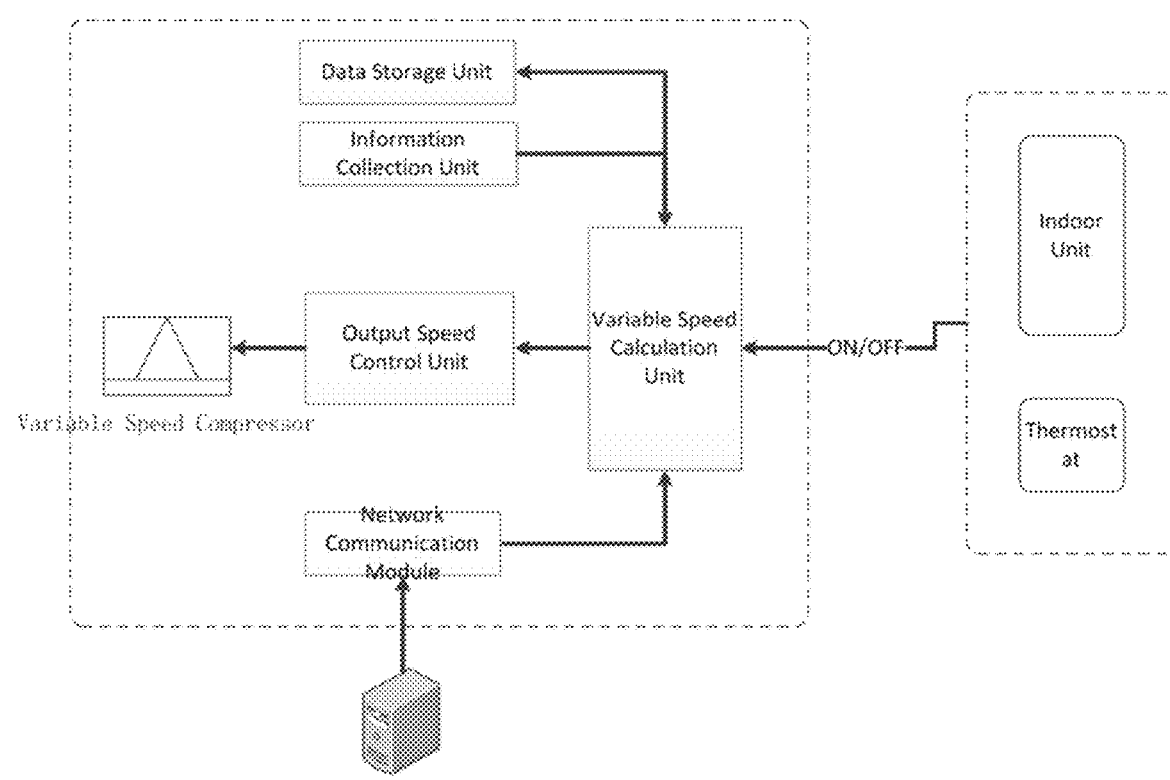
FIG. 3 shows configuration diagram of the first embodiment on how the new variable AC control unit fits into the overall AC system implementation.

FIG. 3 is the variable speed AC control system configuration diagram of the first embodiment, comprises: speed control calculation unit 10, database unit 20, operation data acquisition unit 30, network communication module 40 and output speed control unit 50, wherein the speed control calculation unit 10 is for calculating the indoor load coefficient n, total indoor load N, system capacity q and total system output Q, and based on comparing (1) the product of the total load N and its upper limit coefficient, (2) the product of the total load N and its lower limit coefficient, as well as (3) the total cooling output Q, determining a temperature $T_s$ on target saturation pressure, and based on $T_s$, calculating the high/low output mode total output QH/QL and output duration $t_{high}/t_{low}$; and database unit 20, for storing and providing the indoor load coefficient n/outdoor temperature lookup data, as well as the compressor timing of the operating cycle time2, which are needed by the speed control calculation unit 10; and the operation data acquisition unit 30, for acquiring sensor data generated by the outdoor unit, including outdoor air temperature T, outdoor unit liquid outlet temperature $T_{out}$, compressor return inlet temperature $T_{in}$, compressor discharge temperature $T_{dis}$, the value of the compressor high pressure PH and the low pressure PL; and the network communication unit 40 is used to get weather forecasts results from a remote server, used to obtain in advance the ambient temperature for the operation period; and the output speed control unit 50 for utilizing the output from the speed control calculation unit 10, including the high/low output mode total output QH/QL and output duration $t_{high}/t_{low}$, control the speed of compressor during operation, so that the low output operating cycle $t_{low}$ would coincide with the duration time2 (within which the peak temperature timing occurs); and the speed control calculation unit 10 includes an indoor unit 110 to calculate the total load, and an output unit 120 for calculating total cooling/heating output capacity; and the indoor unit 110 for calculating the total load of N from the $t_0$ to $t_2$ period; and the output unit 120 for calculating total cooling/heating output capacity Q from the $t_1$ to $t_2$ period.

Total Indoor Load Calculation

Figure 4:
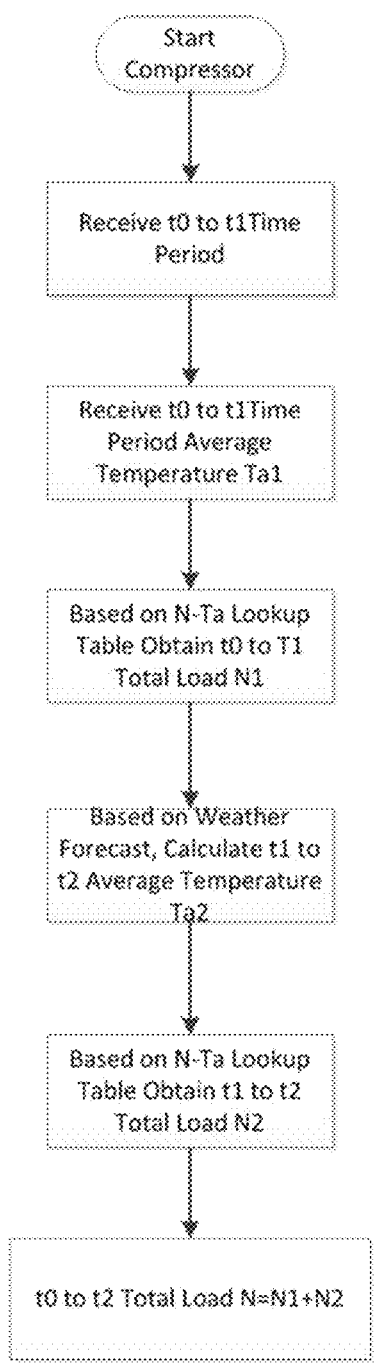
FIG. 4 shows a flowchart of the first embodiment of this disclosure, on how to get the total indoor load.
Figure 5A:
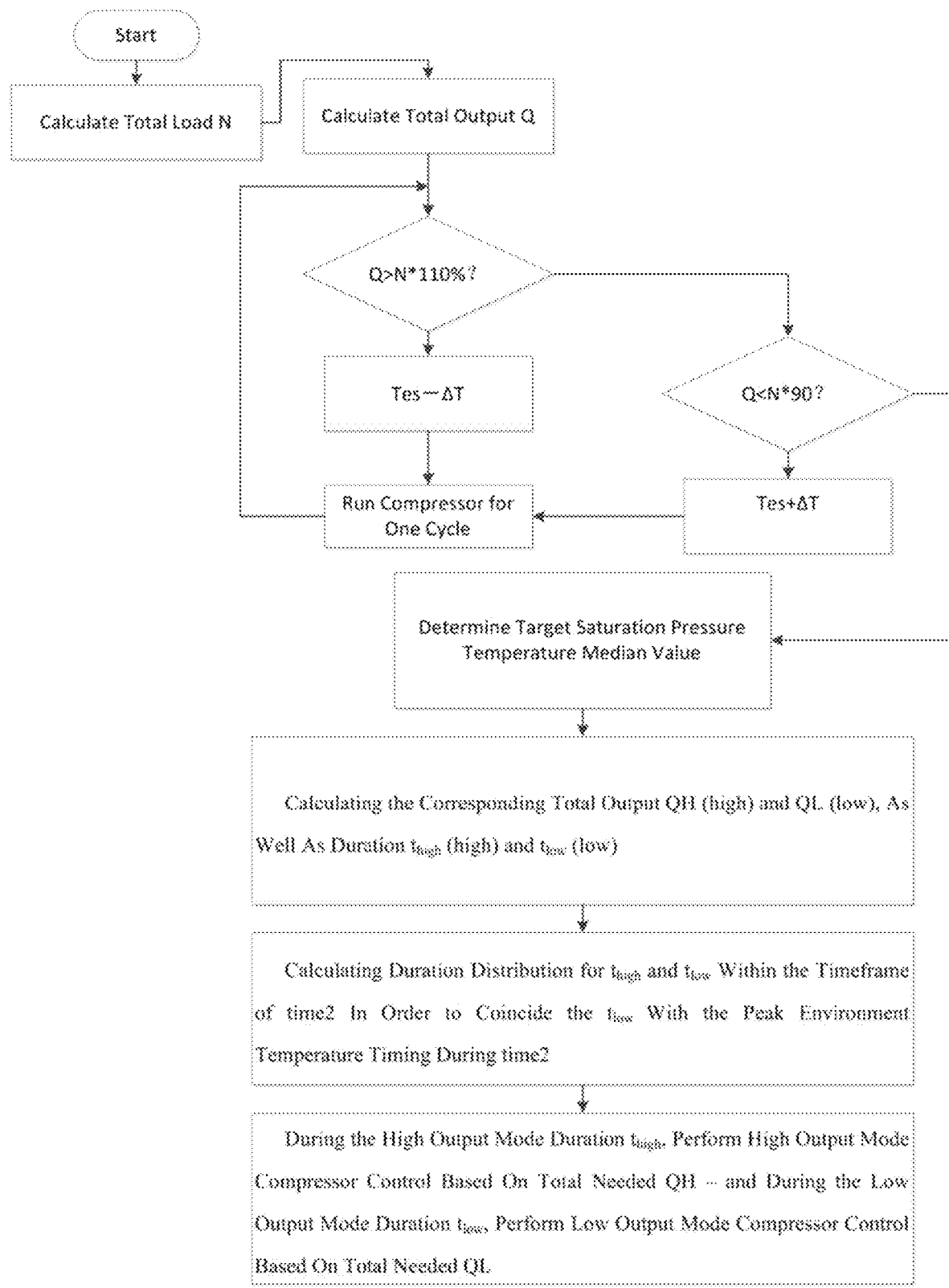
FIG. 5a shows the first embodiment of this disclosure, on how in a cooling mode, the speed is determined in the variable speed system.
Figure 5B:
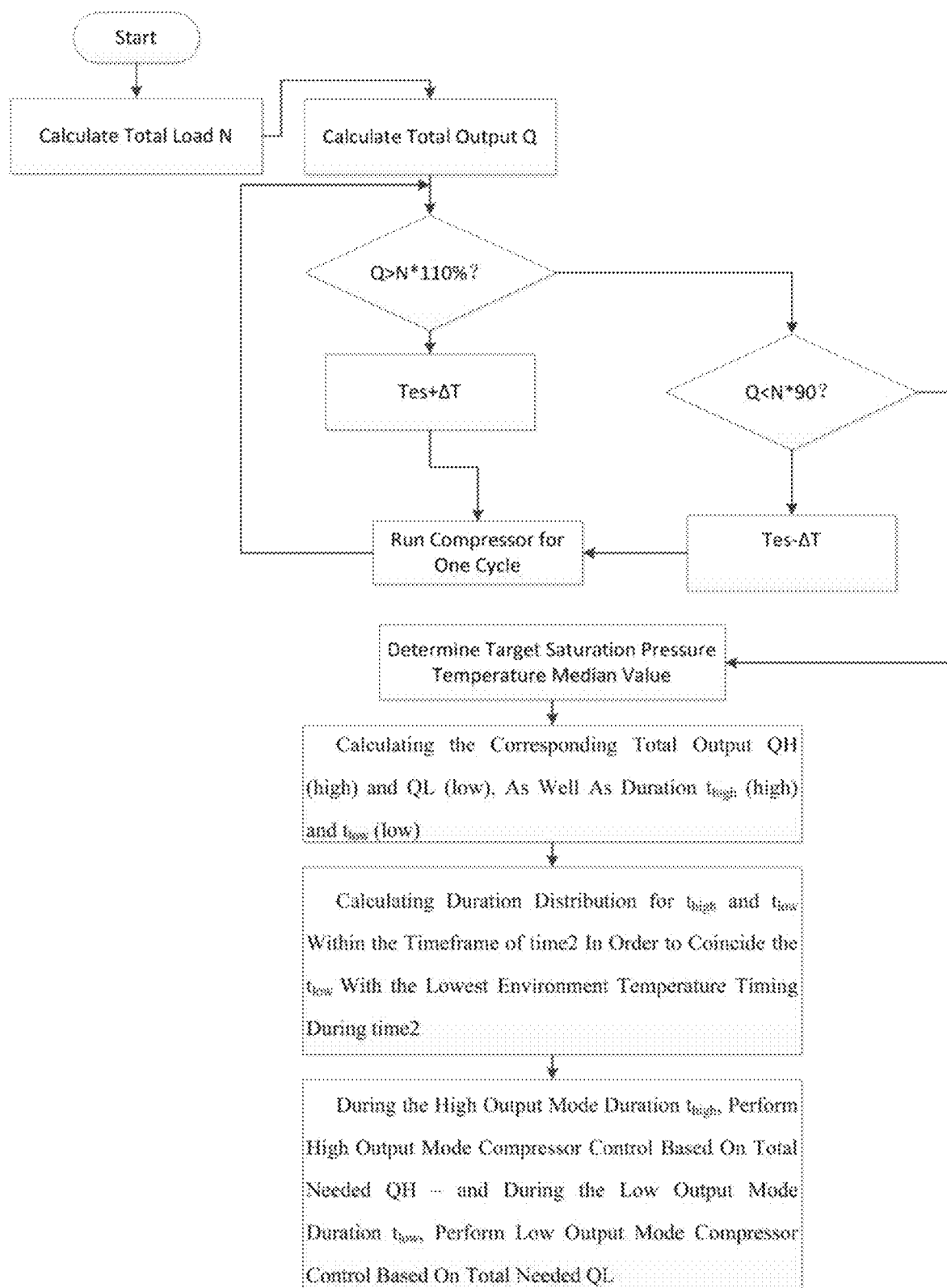
FIG. 5b shows the first embodiment of this disclosure, on how in a heating mode, the speed is determined in the variable speed system.

In this embodiment, the variable speed AC compressor control method uses the results of weather forecast to calculate the total indoor load N. The logic of this calculation depends on at least knowing the future $t_1$ to $t_2$ outdoor temperature change, before starting the AC compressor. As shown in FIG. 4, the steps for calculation of indoor total load are:

a. on AC compressor starting time $t_1$, retrieving the timing from the prior stopping time $t_0$ to the new starting time $t_1$;
b. calculating the average outdoor temperature of $t_0$ to $t_1$ as $T_{a1}$;
c. from the n-$T_a$ lookup table, determining the total indoor load of $N_1$ from $t_0$ to $t_1$;
d. from the weather forecast, receiving the outdoor temperature change information between $t_1$ to $t_2$ period;
e. calculating the average outdoor temperature;
f. from the n-$T_a$ lookup table, determine the total indoor load of $N_2$ from $t_1$ to $t_2$;
g. calculate the total indoor load of N=$N_1$+$N_2$ from $t_0$ to $t_2$;

Cooling Mode DC Speed Control Method

First, the calculation for speed control is based on current compressor operation parameters, assuming the output is Q between $t_1$ and $t_2$.

By comparing the total output Q and indoor total load N, next the method would perform high output mode and low output mode profiling. If Q is greater than N×110%, then adjust the speed control so that the target low saturation pressure temperature $T_{es}$ would be moving the upward by a predetermined value, for example, Tes+1° C., then repeat the comparison of total output Q and indoor total load N. Similarly, if Q is less than N×90%, then adjust the speed control so that $T_{es}$ would be moving the downward by a predetermined value, for example, Tes−1° C.

After satisfying N×90%<Q<N×110% in the profiling process, the method would set the $T_{es}$ median value for the target low saturation pressure temperature, and define Tes−ΔT as the target low saturation pressure temperature for high output mode, for example, Tes−2° C. Similarly, the method would define Tes+ΔT as the target low saturation pressure temperature for low output mode, for example, Tes+2° C. Because the target low saturation pressure temperature $T_{es}$ is related to compressor low pressure value PL, therefore, by taking the operation parameters, and plugging them in formula:

$$Q=\int_{t_1}^{t_2} f(Tes-\Delta T, PL, Ts, RPS) \times (H_{out}-H_{in})dt,$$

one can obtain the total cooling output QH under the high output mode. Similarly, from formula:

$$Q=\int_{t_1}^{t_2} f(Tes+\Delta T, PL, Ts, RPS) \times (H_{out}-H_{in})dt,$$

one can also obtain the total cooling output QL under the low output mode. Therefore, by solving:

$$QH \times t_h + QL \times t_1 = N \text{ and } t_h+t_1=\text{time2},$$

one can obtain the duration for high output mode $t_{high}$ and the duration for low output $t_{low}$.

Next, the system would be run under the target low saturation pressure temperature Tes−ΔT for the duration $t_{high}$ in high output mode, and run under the target low saturation pressure temperature Tes+ΔT for the duration $t_{low}$ in low output mode. At the same time, the system would be run so that the midpoint of the low output duration $t_{low}$ would coincide with the timing of the peak outside temperature that would occur within the compressor on cycle, based on how distribution of the predetermined high output duration $t_{high}$ and low output duration $t_{low}$ is within the compressor on time2 cycle.

Heating Mode DC Speed Control Method

First, the calculation for speed control is based on current compressor operation parameters, assuming the output is Q between $t_1$ and $t_2$.

By comparing the total output Q and indoor total load N, next the method would perform high output mode and low output mode profiling. If Q is greater than N×110%, then adjust the speed control so that the target high saturation pressure temperature Tcs would be moving downward by a predetermined value, for example, Tcs−1° C., then repeat the comparison of total output Q and indoor total load N. Similarly, if Q is less than N×90%, then adjust the speed control so that Tcs would be moving upward by a predetermined value, for example, Tcs+1° C.

After satisfying N×90%<Q<N×110% in the profiling process, the method would set the Tcs median value for the target high saturation pressure temperature, and define Tcs+ΔT as the target high saturation pressure temperature for high output mode, for example, Tcs+2° C. Similarly, the method would define Tcs−ΔT as the target high saturation pressure temperature for low output mode, for example, Tcs+2° C. Because the target high saturation pressure temperature Tcs is related to compressor high pressure value PH, therefore, by taking the operation parameters, and plugging them in formula:

$$Q=\int_{t_1}^{t_2} f(Tcs+\Delta T, PH, Ts, RPS) \times (H_{dis}-H_{out})dt,$$

one can obtain the total heating output QH under the high output mode. Similarly, from formula:

$$Q=\int_{t_1}^{t_2} f(Tcs-\Delta T, PH, Ts, RPS) \times (H_{dis}-H_{out})dt,$$

one can also obtain the total heating output QL under the low output mode. Therefore, by solving:

$$QH \times t_h + QL \times t_1 = N \text{ and } t_h+t_1=\text{time2},$$

one can obtain the duration for high output mode $t_{high}$ and the duration for low output $t_{low}$.

Next, the system would be run under the target high saturation pressure temperature Tcs+ΔT for the duration $t_{high}$ in high output mode, and run under the target high saturation pressure temperature Tcs−ΔT for the duration $t_{low}$ in low output mode. At the same time, the system would be run so that the midpoint of the low output duration $t_{low}$ would coincide with the timing of the lowest outside temperature that would occur within the compressor on cycle, based on how distribution of the predetermined high output duration $t_{high}$ and low output duration $t_{low}$ is within the compressor on time2 cycle.

In this embodiment, the DC speed control compressor system should perform profiling of the system within a few cycle of after being turned on, first finding out the target saturation pressure temperature setting, and after determining the target saturation pressure temperature, based on how distribution of the high output duration and low output duration is, adjust speed control strategy. The temperature increment for testing saturation pressure temperature can be set based on actual operation situation determined by the user or a cloud server. Similarly, the coefficient multiplier for total load N also can be set based on actual operation situation determined by the user or a cloud server. Also can be set by the user or a cloud server is the ΔT value, which can be adjusted based on the user's temperature change sensitivity.

Second Embodiment

The variable speed AC control system of the second embodiment comprises: speed control calculation unit 10, database unit 20, operation data acquisition unit 30, network communication module 40 and output speed control unit 50, wherein the speed control calculation unit 10 is for calculating the indoor load coefficient n, total indoor load N, system capacity q and total system output Q, and based on comparing (1) the product of the total load N and its upper limit coefficient, (2) the product of the total load N and its lower limit coefficient, as well as (3) the total cooling output Q, determining a temperature $T_s$ on target saturation pressure, and based on $T_s$, calculating the high/low output mode total output QH/QL and output duration $t_{high}/t_{low}$; and database unit 20, for storing and providing the indoor load coefficient n/outdoor temperature lookup data, as well as the compressor timing of the operating cycle time2, which are needed by the speed control calculation unit 10; and the operation data acquisition unit 30, for acquiring sensor data generated by the outdoor unit, including outdoor air temperature T, outdoor unit liquid outlet temperature $T_{out}$, compressor return inlet temperature $T_{in}$, compressor discharge temperature $T_{dis}$, the value of the compressor high pressure PH and the low pressure PL; and the network communication unit 40 is used to get weather forecasts results from a remote server, used to obtain in advance the ambient temperature for the operation period; and the output speed control unit 50 for utilizing the output from the speed control calculation unit 10, including the high/low output mode total output QH/QL and output duration $t_{high}/t_{low}$, control the speed of compressor during operation, so that the low output operating cycle $t_{low}$ would coincide with the duration time2 (within which the peak temperature timing occurs); and the speed control calculation unit 10 includes an indoor unit 110 to calculate the total load, and an output unit 120 for calculating total cooling/heating output capacity; and the indoor unit 110 for calculating the total load of N from the $t_0$ to $t_2$ period; and the output unit 120 for calculating total cooling/heating output capacity Q from the $t_1$ to $t_2$ period.

Total Indoor Load Calculation

Figure 6:
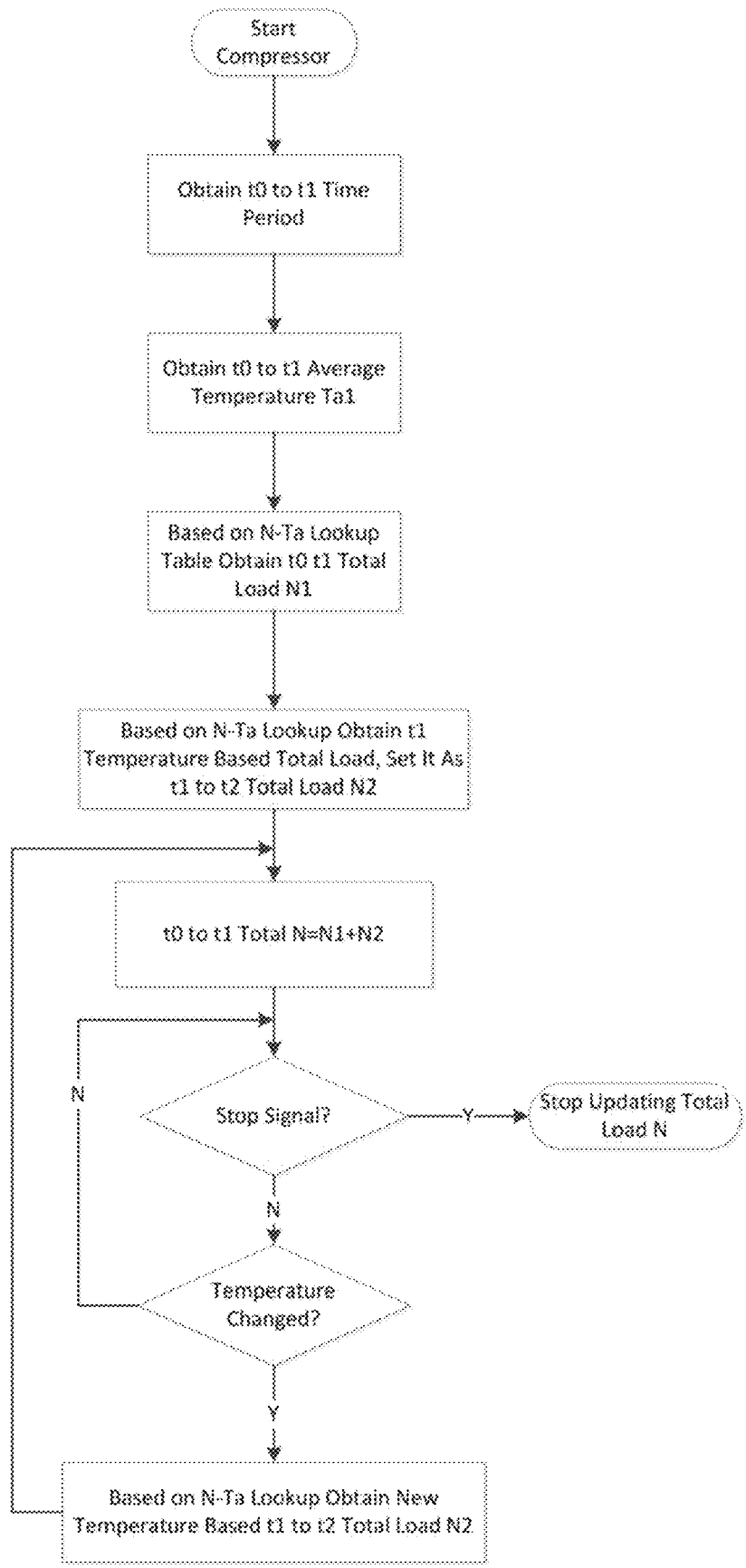
FIG. 6 shows a flowchart of a second embodiment of this disclosure, on how to get the total indoor load.
Figure 7A:
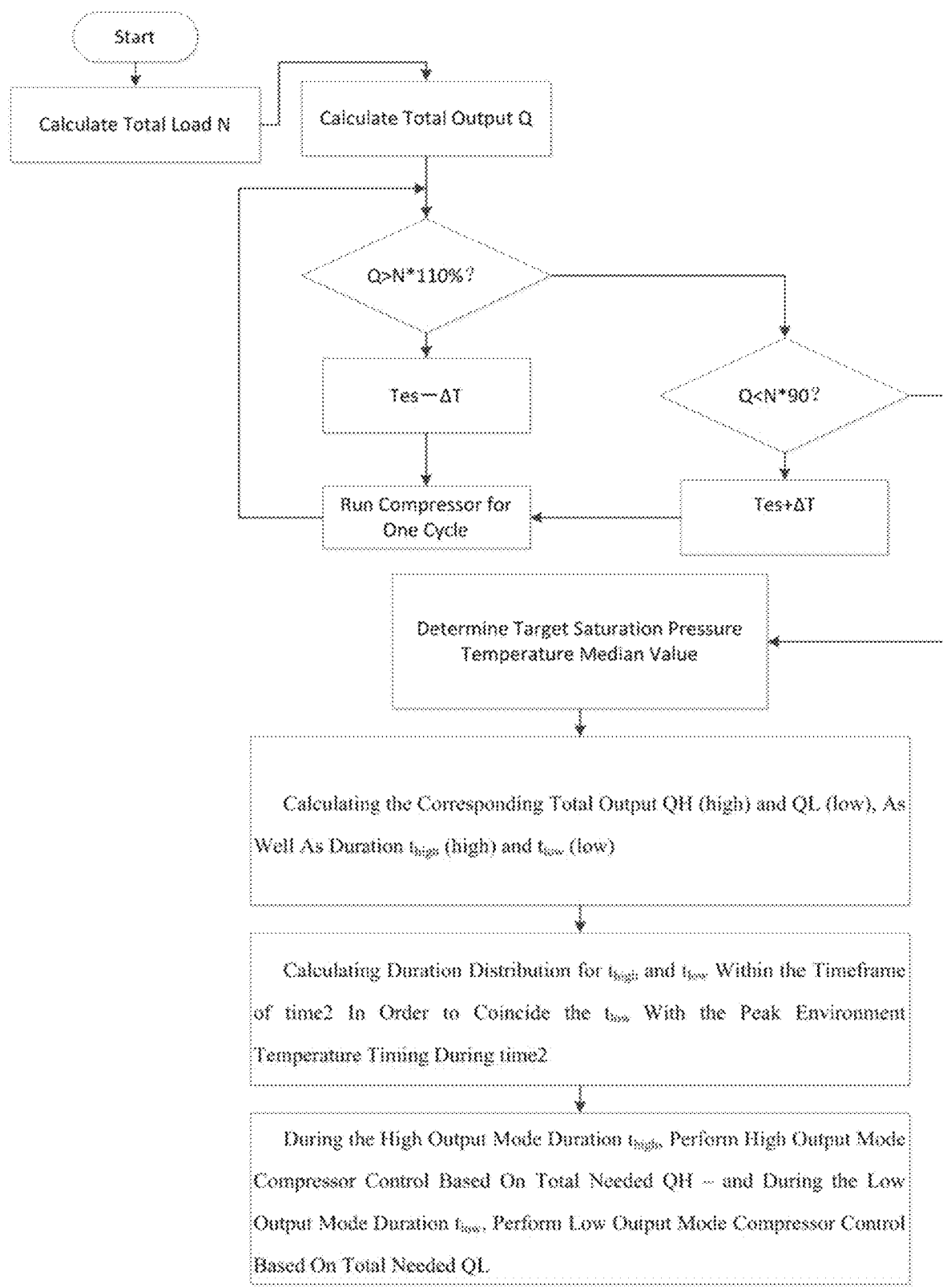
FIG. 7a shows the second embodiment of this disclosure, on how in a cooling mode, the speed is determined in the variable speed system.
Figure 7B:
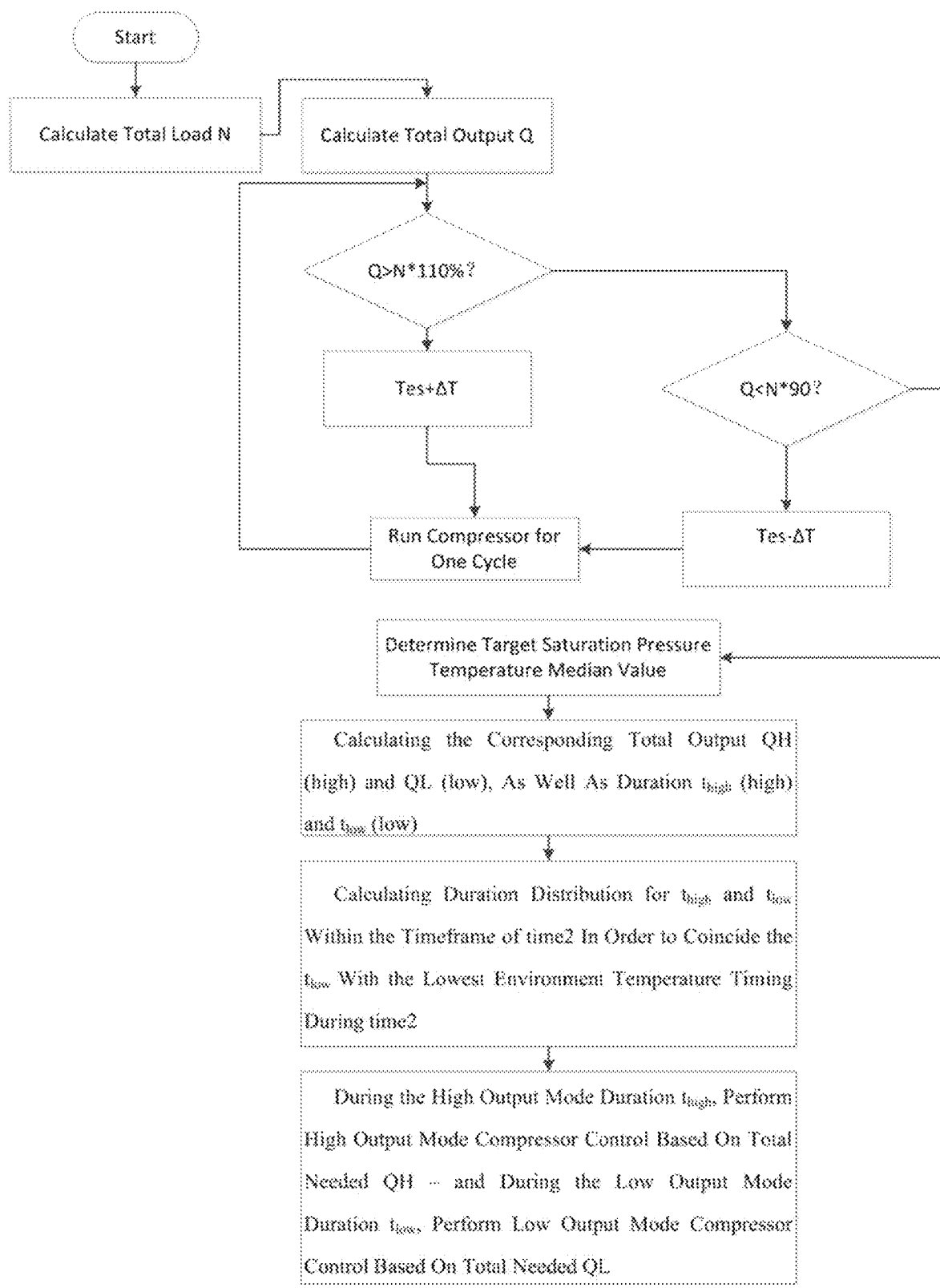
FIG. 7b shows the second embodiment of this disclosure, on how in a heating mode, the speed is determined in the variable speed system.

In this embodiment, the variable speed AC compressor control method uses the results of weather forecast to calculate the total indoor load N. The logic of this calculation depends on at least knowing the future $t_1$ to $t_2$ outdoor temperature change, before starting the AC compressor. As shown in FIG. 6, the steps for calculation of indoor total load are:

a. on AC compressor starting time $t_1$, retrieving the n values from the prior stopping time $t_0$ to the new starting time $t_1$ based on the varied temperature values;

b. by method of accumulation, determining the total indoor load of $N_1$ from $t_0$ to $t_1$;

c. using the calculated average temperature at $t_1$, from the lookup $n-T_a$ table, obtaining the corresponding load coefficient $n(T_a)$, further calculating the total load $N_2$ from $t_1$ to $t_2$ period;

d. calculating the total load as $N=N_1+N_2$;

e. determining whether the stop signal is received—if not, then go to step f—if yes, then stop;

f. determining whether the outdoor temperature has changed—if not, go back to step e—if yes, then go to step g;

g. assuming the load coefficient $n(T_{ax})$ at $t_x$ when the temperature is changed is different from the prior $n(T_a)$, using $n(T_{ax})$ for calculating the total load for the rest of period from $t_x$ to $t_2$, and updating the resulting new $N_2$ before returning to step d.

Cooling Mode DC Speed Control Method

First, the calculation for speed control is based on current compressor operation parameters, assuming the output is Q between $t_1$ and $t_2$.

By comparing the total output Q and indoor total load N, next the method would perform high output mode and low output mode profiling. If Q is greater than N×120%, then adjust the speed control so that the target low saturation pressure temperature $T_{es}$ would be moving the upward by a predetermined value, for example, Tes+1° C., then repeat the comparison of total output Q and indoor total load N. Similarly, if Q is less than N×80%, then adjust the speed control so that $T_{es}$ would be moving the downward by a predetermined value, for example, Tes−1° C.

After satisfying N×80%<Q<N×120% in the profiling process, the method would set the $T_{es}$ median value for the target low saturation pressure temperature, and define Tes−ΔT as the target low saturation pressure temperature for high output mode, for example, Tes−2° C. Similarly, the method would define Tes+ΔT as the target low saturation pressure temperature for low output mode, for example, Tes+2° C. Because the target low saturation pressure temperature $T_{es}$ is related to compressor low pressure value PL, therefore, by taking the operation parameters, and plugging them in formula:

$$Q=\int_{t_1}^{t_2} f(Tes-\Delta T, PL, Ts, RPS) \times (H_{out}-H_{in})dt,$$

one can obtain the total cooling output QH under the high output mode. Similarly, from formula:

$$Q=\int_{t_1}^{t_2} f(Tes+\Delta T, PL, Ts, RPS) \times (H_{out}-H_{in})dt,$$

one can also obtain the total cooling output QL under the low output mode. Therefore, by solving:

$$QH \times t_h + QL \times t_1 = N \text{ and } t_h+t_1=\text{time2},$$

one can obtain the duration for high output mode $t_{high}$ and the duration for low output $t_{low}$.

Next, the system would be run under the target low saturation pressure temperature Tes−ΔT for the duration $t_{high}$ in high output mode, and run under the target low saturation pressure temperature Tes+ΔT for the duration $t_{low}$ in low output mode. At the same time, the system would be run so that the midpoint of the low output duration $t_{low}$ would coincide with the timing of the peak outside temperature that would occur within the compressor on cycle, based on how distribution of the predetermined high output duration $t_{high}$ and low output duration $t_{low}$ is within the compressor on time2 cycle.

Heating Mode DC Speed Control Method

First, the calculation for speed control is based on current compressor operation parameters, assuming the output is Q between $t_1$ and $t_2$.

By comparing the total output Q and indoor total load N, next the method would perform high output mode and low output mode profiling. If Q is greater than N×120%, then adjust the speed control so that the target high saturation pressure temperature Tcs would be moving downward by a predetermined value, for example, Tcs−1° C., then repeat the comparison of total output Q and indoor total load N. Similarly, if Q is less than N×80%, then adjust the speed control so that Tcs would be moving upward by a predetermined value, for example, Tcs+1° C.

After satisfying N×80%<Q<N×120% in the profiling process, the method would set the Tcs median value for the target high saturation pressure temperature, and define Tcs+ΔT as the target high saturation pressure temperature for high output mode, for example, Tcs+2° C. Similarly, the method would define Tcs−ΔT as the target high saturation pressure temperature for low output mode, for example, Tcs+2° C. Because the target high saturation pressure temperature Tcs is related to compressor high pressure value PH, therefore, by taking the operation parameters, and plugging them in formula:

$$Q=\int_{t_1}^{t_2} f(Tcs+\Delta T, PH, Ts, RPS) \times (H_{dis}-H_{out})dt,$$

one can obtain the total heating output QH under the high output mode. Similarly, from formula:

$$Q=\int_{t_1}^{t_2} f(Tcs-\Delta T, PH, Ts, RPS) \times (H_{dis}-H_{out})dt,$$

one can also obtain the total heating output QL under the low output mode. Therefore, by solving:

$$QH \times t_h + QL \times t_1 = N \text{ and } t_h+t_1=\text{time2},$$

one can obtain the duration for high output mode $t_{high}$ and the duration for low output $t_{low}$.

Next, the system would be run under the target high saturation pressure temperature Tcs+ΔT for the duration $t_{high}$ in high output mode, and run under the target high saturation pressure temperature Tcs−ΔT for the duration $t_{low}$ in low output mode. At the same time, the system would be run so that the midpoint of the low output duration $t_{low}$ would coincide with the timing of the lowest outside temperature that would occur within the compressor on cycle, based on how distribution of the predetermined high output duration $t_{high}$ and low output duration now is within the compressor on time2 cycle.

In this embodiment, the DC speed control compressor system should perform profiling of the system within a few cycle of after being turned on, first finding out the target saturation pressure temperature setting, and after determining the target saturation pressure temperature, based on how distribution of the high output duration and low output duration is, adjust speed control strategy. The temperature increment for testing saturation pressure temperature can be set based on actual operation situation determined by the user or a cloud server. Similarly, the coefficient multiplier for total load N also can be set based on actual operation situation determined by the user or a cloud server. Also can be set by the user or a cloud server is the ΔT value, which can be adjusted based on the user's temperature change sensitivity.

The invention claimed is:

1. A variable speed air conditioning AC (meaning cooling or heating) control system comprises: a speed control calculation unit, a database unit, an operation data acquisition unit, a network communication unit and a speed control unit, wherein
   the speed control unit is for taking operational and historical data as inputs from the database unit, the operation data acquisition unit and the network communication unit, setting compressor speed as output that would correspond to energy consumption profile from the operational and historical data, matching indoor load and AC output in thermal unit for each conventional off-on-off operation signaling and timing cycle, whereas the speed is optimally set according to least total energy consumption under relationship between the speed and temperature, and for running the system to follow an optimal indoor temperature curve having timing and temperature as coordinates in saving energy consumption for the period covered by the timing of the optimal indoor temperature curve; and
   the database unit is for storing/providing indoor load coefficient and outdoor temperature lookup data, which are needed by the speed control calculation unit; and
   the operation data acquisition unit is for acquiring sensor data generated by an outdoor unit, including outdoor air temperature, outdoor unit liquid outlet temperature, compressor return inlet temperature, compressor discharge temperature, values of compressor high pressure and low pressure; and
   the network communication unit is used to obtain in advance outdoor temperature values for the period covered by the timing of the optimal indoor temperature curve.

2. The variable speed AC control system according to claim 1, wherein
   the speed control calculation unit is for calculating indoor load coefficient, total indoor load, system capacity and total system output, and based on comparing (1) product of the total load and its upper limit coefficient, (2) product of the total load and its lower limit coefficient, as well as (3) the total system output, determining a temperature on target saturation pressure, and based on that temperature, calculating high and low output mode total output and output duration wherein the high and low output mode output is based on having high and low compressor speed.

3. The variable speed AC control system according to claim 2 wherein
   based on how distribution of high output duration and low output duration is within AC on duration period, the speed control unit adjusts speed control strategy.

4. The variable speed AC control system according to claim 3 wherein
   the speed control strategy adjustment is configured to produce the low output duration to coincide with timing of peak or lowest outside temperature by considering the peak or the lowest outside temperature as increasing total energy consumption.

5. The variable speed AC control system according to claim 4 wherein
   the speed control strategy adjustment is configured to produce the midpoint of low output duration to coincide with timing of the peak or lowest outside temperature.

6. The variable speed AC control system according to claim 5 wherein
   the speed control strategy adjustment is configured to update its calculation when detecting outdoor average temperature change.

7. The variable speed AC control system according to claim 6, wherein
   the speed control calculation unit can chooses coefficient multipliers for total load in its upper/lower limit calculation, or let them be determined by user or a cloud server.

8. The variable speed AC control system according to claim 7, wherein
   temperature increment for testing saturation pressure temperature in high/low mode is set by the user or the cloud server.

9. The variable speed AC control system according to claim 8 wherein
   saturation pressure temperature upper/lower limits is set by the user or the cloud server, based on the user's temperature change sensitivity.

10. A variable speed air conditioning AC (meaning cooling or heating) control method, comprising:
    varying speed between high output and low output mode, matching indoor load and AC output in thermal unit for each conventional off-on-off operation signaling and timing cycle to run AC to follow an optimal indoor temperature curve having timing and temperature as coordinates in saving energy consumption for the period covered by the timing of the optimal indoor temperature curve, wherein the matching of indoor load and AC output for the period is based on looking up specific performance records and wherein projection of the indoor load for the period is further based on temperature forecast data and wherein the optimal indoor temperature curve is corresponding total energy consumption profile and the speed varies optimally according to least total energy consumption under relationship between the speed and the temperature.

11. The variable speed AC control method according to claim 10, further comprising:
    calculating indoor load coefficient, total indoor load, system capacity and total system output, and based on comparing (1) product of the total load and its upper limit coefficient, (2) product of the total load and its lower limit coefficient, as well as (3) the total system output, determining a temperature on target saturation pressure, and based on that temperature, calculating the high and low output mode total output and output duration.

12. The variable speed AC control method according to claim 11, wherein
based on how distribution of high output duration and low output duration is within AC on duration period, the method adjusts speed control strategy.

13. The variable speed AC control method according to claim 12, wherein
the speed control strategy adjustment is configured to produce the low output duration to coincide with timing of peak or lowest outside temperature by considering the peak or the lowest outside temperature as increasing total energy consumption.

14. The variable speed AC control method according to claim 13, wherein
the speed control strategy adjustment is configured to produce the midpoint of low output duration to coincide with timing of peak or lowest outside temperature.

15. The variable speed AC control method according to claim 14, wherein
the speed control strategy adjustment is configured to update its calculation when detecting outdoor average temperature change.

16. The variable speed AC control method according to claim 15, wherein
in the high/low mode calculation step, saturation pressure temperature upper/lower limits, output coefficient multipliers for total load, and temperature increment for testing saturation pressure temperature is determined by user or a cloud server.

17. A non-transitory computer-readable medium having stored thereon a set of computer-executable instructions for causing a first device to perform steps comprising:
calculating indoor load coefficient, total indoor load, system capacity and total system output, and based on comparing (1) product of the total load and its upper limit coefficient, (2) product of the total load and its lower limit coefficient, as well as (3) the total system output, determining a temperature on target saturation pressure, and based on that temperature, calculating the high and low output mode total output and output duration; and varying speed between high output and low output mode, matching indoor load and AC output in thermal unit for each conventional off-on-off operation signaling and timing cycle to run air conditioning AC to follow an optimal indoor temperature curve having timing and temperature as coordinates in saving energy consumption for the period covered by the timing of the optimal indoor temperature curve so that the low output duration to coincide with timing of peak or lowest outside temperature by considering the peak or the lowest outside temperature as increasing total energy consumption and wherein the optimal indoor temperature curve is corresponding total energy consumption profile and the speed varies optimally according to least total energy consumption under relationship between the speed and the temperature.

18. The non-transitory computer-readable medium according to claim 17, wherein:
the speed control step is configured to produce the midpoint of low output duration to coincide with timing of peak or lowest outside temperature.

19. The non-transitory computer-readable medium according to claim 18, wherein
the speed control step is configured to update its calculation when detecting outdoor average temperature change.

20. The non-transitory computer-readable medium according to claim 19, wherein
in the high/low mode calculation step, saturation pressure temperature upper/lower limits, output coefficient multipliers for total load, and temperature increment for testing saturation pressure temperature is determined by user or a cloud server.

* * * * *